Figure 1:
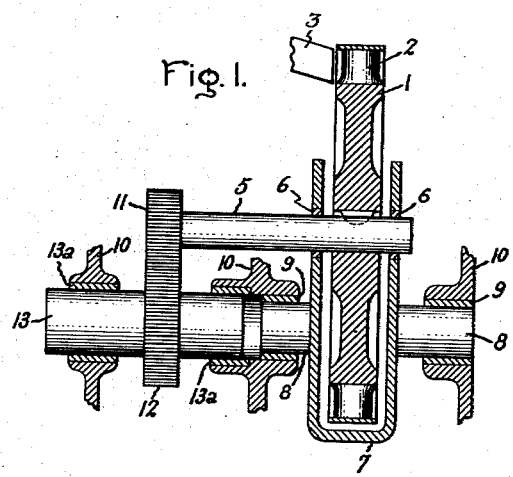

Sept. 21, 1954　　　D. H. GRAHAM ET AL　　　2,689,707
SPEED LIMITING ARRANGEMENT FOR TURBINE ROTORS
Filed Feb. 17, 1949　　　　　　　　　　　　2 Sheets-Sheet 1

Inventors:
Douglas H. Graham,
George Tabberer,
by *Prowell S. Mack*
Their Attorney.

Sept. 21, 1954  D. H. GRAHAM ET AL  2,689,707
SPEED LIMITING ARRANGEMENT FOR TURBINE ROTORS
Filed Feb. 17, 1949

2 Sheets-Sheet 2

Inventors:
Douglas H. Graham,
George Tabberer,
by Travell P. Mack
Their Attorney.

Patented Sept. 21, 1954

2,689,707

UNITED STATES PATENT OFFICE 2,689,707

SPEED LIMITING ARRANGEMENT FOR TURBINE ROTORS

Douglas H. Graham and George Tabberer, Coventry, England, assignors to General Electric Company, a corporation of New York Application February 17, 1949, Serial No. 76,978

Claims priority, application Great Britain March 8, 1948

10 Claims. (Cl. 253—59)

This invention relates to fluid pressure turbines and particularly to speed limiting devices for turbine-type starter motors for internal combustion powerplants.

Particularly in aircraft service, it is desirable and customary to provide motive fluid for driving starters of the above-mentioned type from the combustion of suitable fluid in a limited space so as to form gases under pressure. In such devices the fuel is usually stored in "cartridges" which are provided with sufficient fuel for the starting operation. The amount of fuel necessary to provide sufficient energy for starting a particular engine or gas turbine is determined by experiment, and precisely this amount of fuel is thereafter provided in each individual cartridge.

The invention may be used with gas turbines and also with reciprocating engines having moving parts of considerable mass, since either of these types of powerplant require the expenditure of considerable energy in order to effect starting. If, during the starting operation, the starter becomes disconnected from its load, as for example due to the powerplant accelerating under its own power rather early in the starting cycle, or due to failure of the driving mechanism, or for any reason whatever, a condition may arise where considerable unexpended energy still remains in the cartridge which can serve no purpose except to accelerate and perhaps overspeed the turbine rotor. In such case, the final or limiting speed of the starter which will be attained would be dependent upon the inertia of the rotating mass of the starting device and upon the amount of the remaining energy in the cartridge at the time the starter becomes disconnected from the powerplant. It is generally impractical to provide the rotating parts of the starter with sufficient inertia to prevent overspeeding of the starter, particularly in the case of aircraft applications, since this would require more space and weight than is usually permissible. Furthermore, with increased inertia in the starter rotor, a starting cartridge of larger size would be required because of the larger mass to be accelerated to starting speed. As previously indicated, this problem is particularly important in starting gas turbine type powerplants or reciprocating powerplants having moving parts of considerable mass, because the large masses to be accelerated generally require the use of a comparatively large starting cartridge. Thus it is apparent that in certain applications employing large starting cartridges, there may be sufficient unexpended energy available to accelerate the starter turbine rotor to its bursting speed within a very short time interval.

Accordingly, it is an object of this invention to provide novel arrangements which will prevent turbine-type starting motors from reaching an unsafe speed, which arrangements are mechanically simple, quick acting, and light in weight.

Another object is to provide speed limiting apparatus of the type described which is fully automatic, causes smooth acceleration during the starting cycle and, in the event of a false start, permits an immediate second attempt to start without waiting for the engine to come to rest.

A further object is to provide apparatus of the type described in which bearing loads on the turbine rotor are greatly reduced or entirely eliminated.

Figure 2:
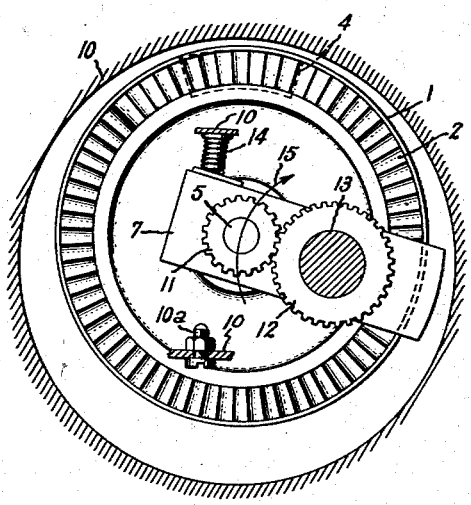
Figure 3:
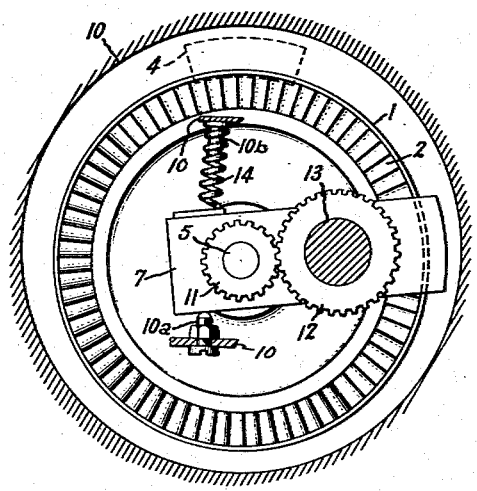
Figure 4:
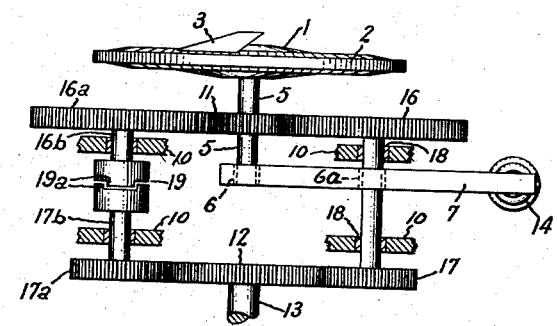
Figure 5:
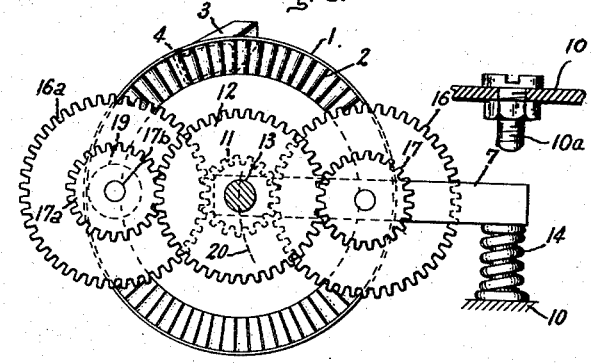
Figure 6:
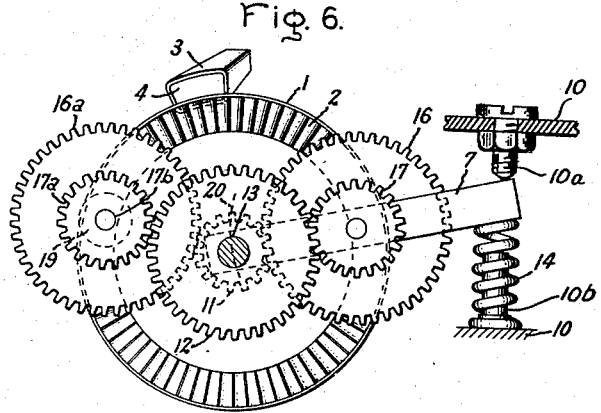

Other objects and advantages will be apparent from the following description taken in connection with the accompanying drawings in which Fig. 1 is a sectional view of a turbine-type starter motor in accordance with the invention. Figs. 2 and 3 are end views of the arrangement shown in Fig. 1 illustrating limiting positions of the turbine rotor; Fig. 4 is another sectional view of a modified arrangement, and Figs. 5 and 6 are end views of Fig. 4 illustrating limiting positions of the turbine rotor.

Referring now to Figs. 1–3, a turbine wheel 1, having blades 2 is driven by motive fluid discharged from a turbine nozzle 3 having a discharge opening 4. Rotor shaft 5 is secured to the turbine wheel and the turbine wheel and shaft are rotatably supported by bearings 6, which are mounted in a forked or U-shaped supporting member 7. Coaxial shaft portions 8 are secured to support member 7 and are supported in suitable bearings 9 in such a manner that the turbine wheel 1, shaft 5 and support member 7 can rotate as a unit with respect to the turbine casing 10. Suitable stops 10a, 10b are provided to limit the amount of angular movement of support member 7. Secured to one end of shaft 5 is a gear 11, which meshes with and drives a second gear 12. Gear 12 is carried by an output shaft 13, which is rotatably supported by suitable bearings 13a in casing 10. Shaft 13 may be connected to an engine shaft by any well known type of automatic engaging and disengaging device or starter drive (not shown). It is important that shaft 13 is disposed coaxially with shaft portions 8 in order to maintain correct meshing of the gears 11, 12 at all times.

Referring now to Fig. 2, the turbine wheel is shown in one limiting position in which the turbine blades 2 are fully within the path of the motive fluid; that is, in a maximum torque position. In Fig. 3 the turbine blades are almost completely out of the path of the motive fluid; that is, a reduced torque position.

Movement of the supporting member 7 may be effected in any convenient manner, for example, by a centrifugal device or a stretching disk, more particularly described in a co-pending application Serial No. 15,234, filed March 16, 1948, now Patent 2,459,519, and assigned to the same assignee as the present application, or by electromagnetic means, or by manual control. Another method which has been found to give excellent results is illustrated in Figs. 2 and 3. Spring means 14 supported in casing 10 biases support member 7 against stop 10a. In this position the turbine wheel is nearly out of the path of the motive fluid. As will appear presently, it may be desirable to make stop 10a adjustable.

In operation, motive fluid is supplied from a suitable cartridge or other source through suitable conduits (not shown) to the turbine nozzle 3. The flow of motive fluid through the nozzle produces a small amount of torque which rotates the turbine wheel. This rotation by well known means (not shown) causes output shaft 13 to engage a clutch (not shown) and because of the reduced torque, and therefore reduced speed of the turbine wheel at the moment of engagement, the shock of engagement is greatly reduced. When engagement has been effected and the turbine attempts to drive the output shaft 13, torque reaction resulting from the load will be established in the direction of the arrow 15. This torque reaction finally overcomes the biasing effect of the spring means 14 and causes the turbine wheel to move to the normal operating or full torque position with the turbine blades completely in the path of the motive fluid, as indicated in Fig. 2.

If the load is removed from the starter before the cartridge is completely exhausted, or if the starter becomes disconnected from the load for any reason whatever, the torque reaction will disappear and the spring means 14 will cause the turbine wheel to move out of the path of the motive fluid into the low torque position, thus reducing the speed which the unloaded starting turbine might otherwise attain.

Since the load, particularly in the case of gas turbine power plants, is chiefly due to the inertia of the rotor of the powerplant, it will be apparent to those skilled in the art that if stop 10a is adjusted to a position to provide turbine torque in the low torque position so that the following ratio holds:

$$\frac{\text{Reduced torque}}{\text{Full torque}} = \frac{WR^2 \text{ (turbine rotor)}}{WR^2 \text{ (turbine rotor)} + WR^2 \text{ (turbine load)}}$$

the rate of acceleration will be constant irrespective of whether or not the starter is loaded, and consequently, the same peak speed will be reached. The symbol $WR^2$, as used herein, is the applicable moment of inertia of the components referred to in the above-mentioned equation. Thus the term $WR^2$ (turbine rotor) is the moment of inertia of the turbine rotor components 1, 2, 5 and 11. The term $WR^2$ (turbine load) is the combined moment of inertia of gear 12, output shaft 13, plus the moment of inertia of the load (not shown) connected to shaft 13. In the above equation, the gear ratio between the turbine and the engine must be taken into account in evaluating the moment of inertia. This feature provides complete protection to the starting turbine in the event that a cartridge is fired when the engine is running. If the engine is running at a speed within the normal speed range of the starter, the starter will run up to this speed in the low torque position, engage the engine, change over to full torque and accelerate the engine to the normal peak speed. This is an important feature, particularly in the case of gas turbine power plants where due to the high moment of inertia it may required several minutes for the engine to come to rest. The present invention permits a second attempt to start to be made immediately without damage to the starter.

In some cases where the torque is high, it may be desirable to drive through two or more gears so as to reduce, or entirely equalize, loads on the bearings of the starting turbine rotor. An arrangement for accomplishing these ends is illustrated in Figs. 4–6, in which like elements bear like notation and in which a turbine wheel 1 having turbine blades 2 is driven by motive fluid discharged from a turbine nozzle 3. The discharge opening 4 of nozzle 3 is indicated in Figs. 5 and 6. Integral with turbine wheel 1 is a shaft 5 carrying a gear 11. The turbine wheel 1, shaft 5, and gear 11 are rotatably supported by suitable bearing means 6. Bearings 6 are mounted in a support member 7 which, in turn, is rotatably supported in a manner to be described presently.

A gear 16 which meshes with gear 11 is integral with another gear 17 and axially spaced therefrom. Gears 16, 17 are rotatably supported by suitable bearings 18 which, in turn may be supported in casing 10. Support member 7 is journaled or pivoted coaxially with gears 16, 17 by bearing 6a and is arranged for limited angular movement relative to the pivot point. On the opposite side of gear 11 is a gear 16a which is similar to gear 16, and driven thereby is a gear 17a which meshes with and drives gear 12 carried by output shaft 13.

It will be apparent that since gears 16, 16a mesh with gear 11, and gears 17, 17a mesh with gear 12, the turbine wheel and shaft including gear 11 is not capable of being moved angularly about the axis of the pivot point; that is, the axis of gears 16, 17. In order to permit relative movement of gears 16a, 17a and thus permit angular movement of the turbine wheel and gear 11, shaft portions 16b and 17b are secured to gears 16a and 17a respectively. Shaft portions 16b, 17b are connected by a well known type of coupling 19 having dogs or splines 19a which are provided with considerable clearance or backlash so as to allow limited rotation of gear 16a relative to gear 17a. Thus the turbine wheel 1, shaft 5, support arm 7 and gear 11 are arranged to rotate as a unit to a limited degree with the axis of the turbine wheel describing a path indicated by the dotted lines 20.

The size of the teeth of gears 11 and 16a and the amount of movement which is permitted to supporting member 7 are chosen so that gears 11 and 16a never come completely out of mesh with each other.

As previously indicated in connection with Figs. 1–3, a high torque condition is obtained when the turbine wheel is substantially in the path of the motive fluid. This position is indicated in Fig. 5. Fig. 6 illustrates the low torque condition wherein the turbine blades are moved substantially out of the path of the motive fluid. As previously indicated, spring means 14 may be employed to bias rotor supporting member 7 against the stop 10a to the low torque position.

In operation, this embodiment of the invention functions in a manner similar to that described in connection with Figs. 1–3. When the turbine wheel is running in the low torque position illustrated in Fig. 6 and load is applied to the output shaft 13, torque reaction resulting from the application of load acts in opposition to the biasing force of spring 14. When the torque reaction increases sufficiently to overcome the biasing force, turbine wheel 1, gear 11, and support member 7 are caused to move to the high torque position with the axis of the turbine wheel following the path indicated by the dotted lines 20, as indicated in Fig. 5. Sufficient clearance or backlash is provided in the coupling dogs or splines 19a to permit gear 16a to rotate relative to gear 17a without interfering with the movement of the turbine wheel and gear 11. When the normal operating or high torque position of the turbine rotor is reached, the clearance or backlash of coupling 19 is completely taken up so that torque is transmitted from the turbine wheel through gears 11, 12, 16a, 17a, and coupling 19 as well as through gears 16, 17. It will be apparent that when the turbine is loaded and operating in the high torque position, the turbine wheel is effectively locked in this position since the coupling clearance is completely taken up, thus preventing relative rotation between gears 16a, 17a and the torque reaction resulting from the load prevents the rotor from returning to the low torque position.

When the load is removed, the torque reaction disappears and the turbine wheel is returned to the low torque position by the biasing spring 14. In the low torque position, gears 16a, 17a and coupling 19 act merely as idlers, and the torque is transmitted from the turbine wheel to the output shaft through gears 11, 12, 16, and 17.

While particular embodiments of the invention have been illustrated and described, it will be apparent to those familiar with the art that various changes and modifications may be made without departing from the invention, and it is intended to cover in the appended claims all such changes and modifications as come within the true spirit and scope of the invention.

What we claim as new and desire to secure by Letters Patent of the United States is:

1. In a turbine having a support, a bucket wheel, a shaft secured to the bucket wheel and having a first gear fixed thereto, and nozzle means for directing motive fluid through the turbine buckets, the combination of speed limiting means including a movable member rotatably supporting the bucket wheel and said shaft, said member being pivoted on the turbine support and arranged for limited angular rotation about the pivot line, said pivot line being offset from the axis of said bucket wheel, an output shaft coaxial with the pivot line, a second gear fixed to said output shaft and meshed with said first gear, said member being arranged to locate said bucket wheel so as to receive substantially all the motive fluid issuing from said nozzle means in a first limiting position and to receive only a portion of the motive fluid in other positions, and biasing means connected between said movable member and said support to bias said member to said other positions, whereby torque reaction resulting from application of load to the output shaft overcomes the effect of the biasing means and causes said member to move to the first position and the biasing means causes said member to move to the other positions upon reduction of load.

2. Apparatus in accordance with claim 1 wherein first and second stops are carried by said support to limit angular rotation of said movable member, the location of and spacing between said stops being so related that the following torque relation is obtained:

$$\frac{\text{Reduced torque}}{\text{Full torque}} = \frac{WR^2 \text{ (turbine rotor)}}{WR^2 \text{ (turbine rotor)} + WR^2 \text{ (tubine load)}}$$

3. In a turbine having a support, a bladed rotor, and nozzle means for directing motive fluid through the bladed rotor, the combination of speed limiting means including a drive gear coaxial with and connected to the bladed rotor; an output shaft; an output gear fixed to said output shaft; gearing connecting said drive gear and the output shaft and including two countershafts journalled in said support, each of said countershafts carrying a first gear meshing with said drive gear and a second gear meshing mediately or immediately with said output gear; a support member rotatably supporting said rotor and the drive gear, said member being pivotally mounted on said support and pivoted about the axis of one of said countershafts and arranged for limited angular movement about said axis, the other countershaft being divided into first and second shaft portions which carry said first and second gears respectively, coupling means connecting said first and second shaft portions and adapted to permit limited relative rotation thereof, a first limiting position of said support member and bladed rotor being such that the bladed rotor is substantially in the path of motive fluid discharged from the nozzle means and a second limiting position being such that the rotor is substantially out of the path of the motive fluid, and means biasing said support member to the second position, whereby torque reaction resulting from the application of load to the output shaft overcomes the biasing effect and causes the rotor to move to the first limiting position and the biasing means causes the rotor to return to the second position upon removal of load from said shaft.

4. In a turbine having a support, a bladed rotor, and nozzle means for directing motive fluid through the bladed rotor, the combination of speed limiting means including a first gear coaxially secured to said rotor; a shaft adapted to be connected to a turbine load; a gear fixed to said shaft; gearing connecting the first gear and said gear fixed to said shaft and including at least two countershafts rotatably supported in said support, means connecting first and second shaft portions of one of said countershafts and adapted to permit limited rotation of one shaft portion relative to the other shaft portion, a gear fixed to said first shaft portion and meshed with said first gear, and a gear fixed to said second shaft portion and meshed mediately or immediately with the gear fixed to said shaft; and a movable support member rotatably supporting the bladed rotor and the first gear, said member being pivotally mounted on said support and pivoted about the axis of the second countershaft and arranged for limited angular movement about said axis, one limiting position of said support member and bladed rotor being a high-torque position wherein the bladed rotor is located with respect to the nozzle means so as to receive substantially all the motive fluid issuing therefrom and a low-torque limiting position in which the rotor is displaced relative to the nozzle means so as to receive only a portion of the motive fluid, means biasing the rotor to the low-torque position, whereby torque reaction resulting from the application of load to the shaft overcomes the effect of the biasing means and causes the rotor to move from the low-torque to the high-torque position and the biasing means causes the rotor to return to the low-torque position upon removal of load from the shaft.

5. Apparatus in accordance with claim 4 wherein first and second stops are carried by said support to limit angular rotation of said movable member, the location of and spacing between said stops being such that the full torque and reduced torque limiting positions are so related that the following torque relation is obtained:

$$\frac{\text{Reduced torque}}{\text{Full torque}} = \frac{WR^2 \text{ (turbine rotor)}}{WR^2 \text{ (turbine rotor)} + WR^2 \text{ (turbine load)}}$$

6. In a fluid pressure energy converting apparatus having a bladed rotor and nozzle means for directing a jet of motive fluid through the bladed rotor, means comprising a spring biased movable member rotatably supporting said rotor for moving the rotor out of the jet of motive fluid directed by said nozzle means in response to changes in the load imposed on said rotor.

7. In a turbine having a support, a bladed rotor and nozzle means for directing a jet of motive fluid through the bladed rotor, means for moving the bladed rotor away from the jet of motive fluid to prevent overspeeding of said rotor comprising an output shaft connected to said bladed rotor through meshing gears one of which is fixed to said rotor and one of which is fixed to said output shaft, a movable member rotatably supporting the bladed rotor, and means including a biasing spring between said support and said movable member for effecting movements of said member in response to changes in the torque transmitted through said meshing gears to the output shaft.

8. In a turbine having a bladed rotor and nozzle means for directing motive fluid through said rotor, the combination of an output shaft, a member carrying said rotor and pivoted about an axis coaxial with said output shaft, a first gear secured to the output shaft, and a second gear secured to the bladed rotor and in mesh with the first gear, the direction of rotation of said rotor being such as to cause the axis of the bladed rotor to be displaced away from said nozzle means without changing the mesh between said first and second gears.

9. In a turbine having a bladed rotor, a support and nozzle means for directing a jet of motive fluid through the bladed rotor, the combination comprising a first gear coaxially secured to said rotor, an output shaft having a gear thereon, gearing connecting the first gear and the gear on said output shaft including a pair of countershafts on opposite sides of said output shaft and with the axes of said countershafts disposed substantially in a common plane containing the axis of said output shaft and a gear carried by each of said countershafts and meshed with said first gear, means connecting first and second shaft portions of one of said countershafts and adapted to permit limited rotation of one shaft portion relative to the other shaft portion, a movable member rotatably supporting the bladed rotor and the first gear, said member being pivoted on said support coaxially with respect to the axis of the other countershaft and arranged for limited angular movement about said axis, one limiting position of said member and bladed rotor being with the axes of said countershafts, said output shaft, and said first gear contained substantially in said common plane, and another limiting position of said member being with the axis of the first gear moved out of said common plane and said rotor displaced relative to said nozzle means.

10. In a turbine having a support, a bladed rotor, and stationary nozzle means for directing motive fluid through the bladed rotor, the combination of speed limiting means including a movable member pivotally mounted on said support and arranged for limited angular movement about the pivot axis, bearing means carried by said movable member and supporting said bladed rotor for rotation about an axis offset from said pivot axis, said member being arranged to align the turbine blades with said nozzle means to effect passage of motive fluid through the bladed rotor in a first position and to move the rotor substantially out of the path of the motive fluid issuing from said nozzle means in a second position, a shaft journaled in said support for rotation about an axis coincident with said pivot axis, a first gear coaxial with said rotor and fixed thereto, a second gear fixed on said shaft and meshed with said first gear, and means comprising a spring connected between said support and said movable member to bias the latter to said second position, whereby torque reaction resulting from the application of load to said shaft overcomes the biasing means and causes the rotor to move to the first position and the biasing means causes the rotor to move to the second position upon reduction of load.

References Cited in the file of this patent
UNITED STATES PATENTS

| Number | Name | Date |
|---|---|---|
| 96,182 | Anderson | Oct. 26, 1869 |
| 556,476 | Richardson | Mar. 17, 1896 |
| 1,071,513 | De Mill | Aug. 26, 1913 |
| 1,505,909 | Melin | Aug. 19, 1924 |